July 31, 1951     H. F. MERRIAM ET AL     2,562,240
MANUFACTURE OF OLEUM

Filed March 11, 1944     5 Sheets-Sheet 1

INVENTORS
Henry F. Merriam
Tom Cummings
BY
ATTORNEY

July 31, 1951  H. F. MERRIAM ET AL  2,562,240
MANUFACTURE OF OLEUM
Filed March 11, 1944  5 Sheets-Sheet 5

INVENTORS
Henry F. Merriam
Tom Cummings
BY
Joseph A. Ryan
ATTORNEY

Patented July 31, 1951

2,562,240

UNITED STATES PATENT OFFICE 2,562,240

MANUFACTURE OF OLEUM

Henry F. Merriam, West Orange, N. J., and Tom Cummings, Brooklyn, N. Y., assignors to Allied Chemical & Dye Corporation, a corporation of New York Application March 11, 1944, Serial No. 526,108

6 Claims. (Cl. 23—167)

This invention relates to improvements in processes for manufacture of oleum.

Oleum of commercial strengths is made customarily by contacting oleum with a gas containing $SO_3$ under conditions such as to effect absorption of $SO_3$ while adding acid of lower strength to maintain constant composition in the contacting zone.

Principal object of this invention is to provide procedure by practice of which it is possible to greatly increase efficiency of $SO_3$ gas absorption in oleum liquors.

Figure 1:
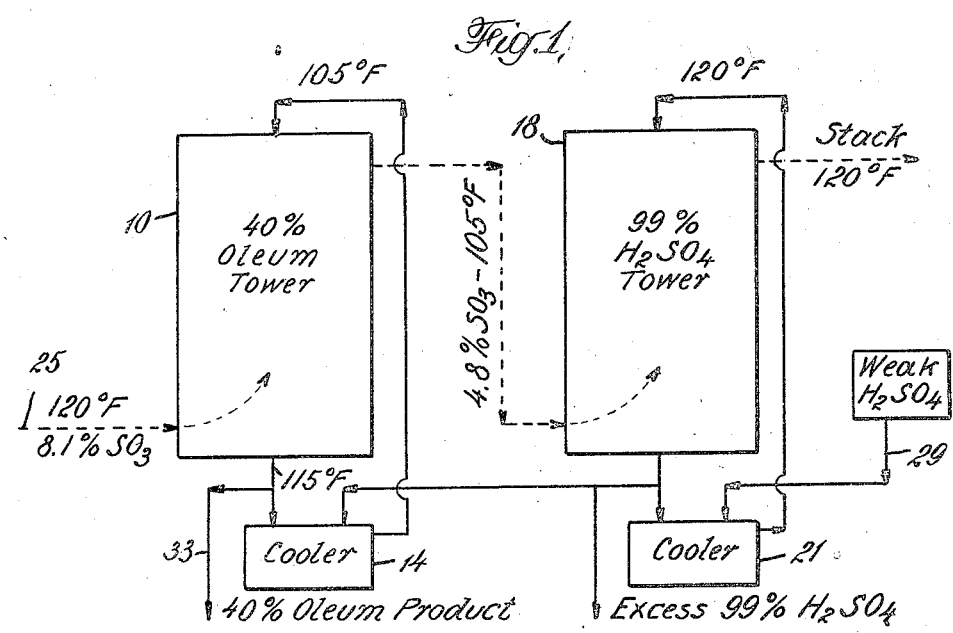
Figure 2:
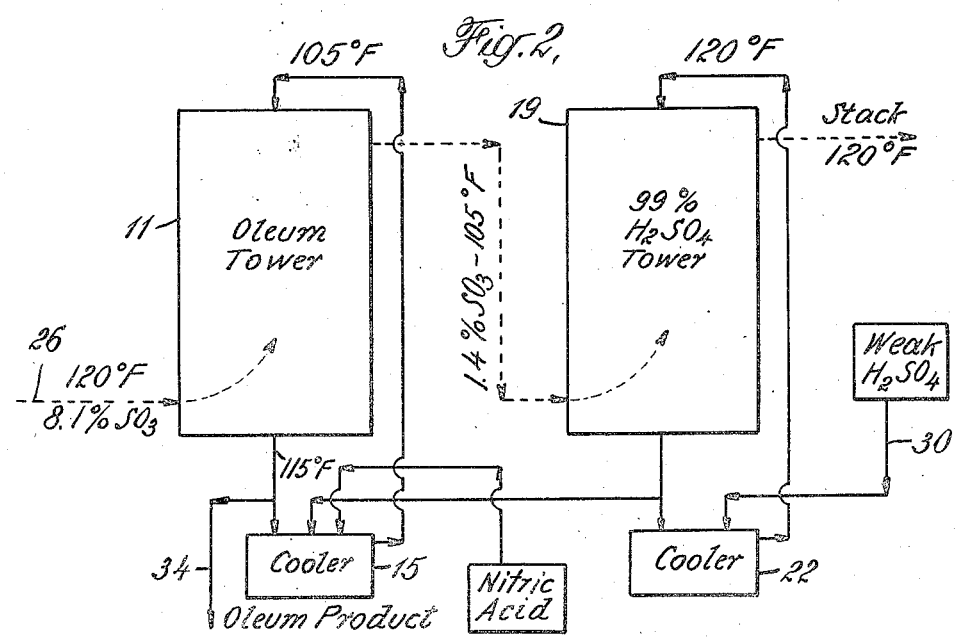
Figure 3:
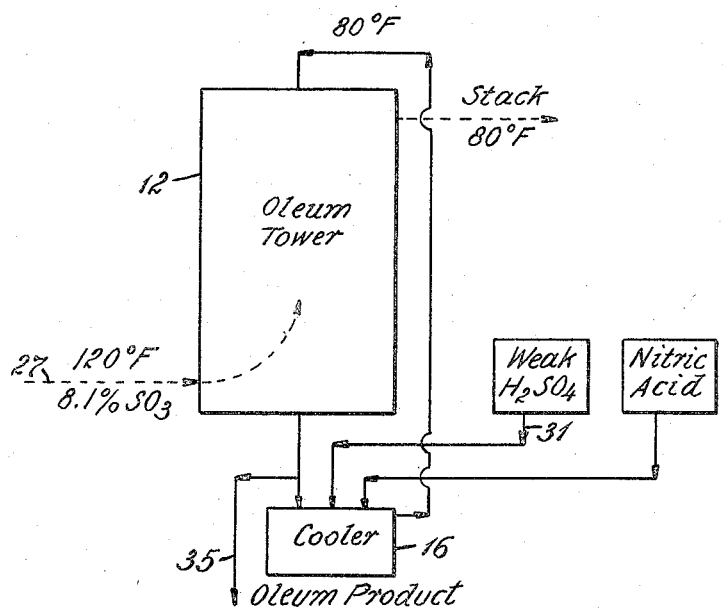
Figure 4:
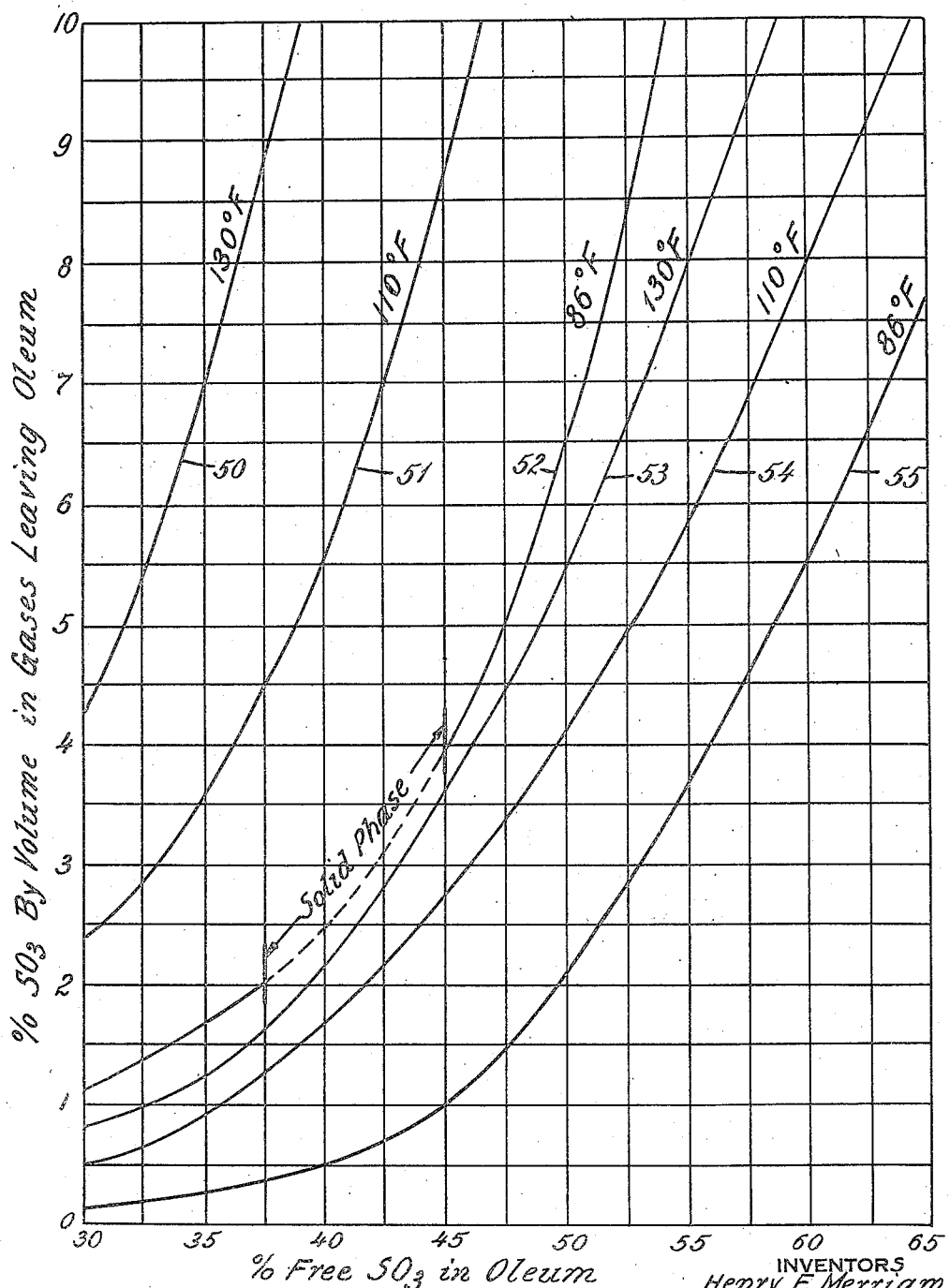
Figure 5:
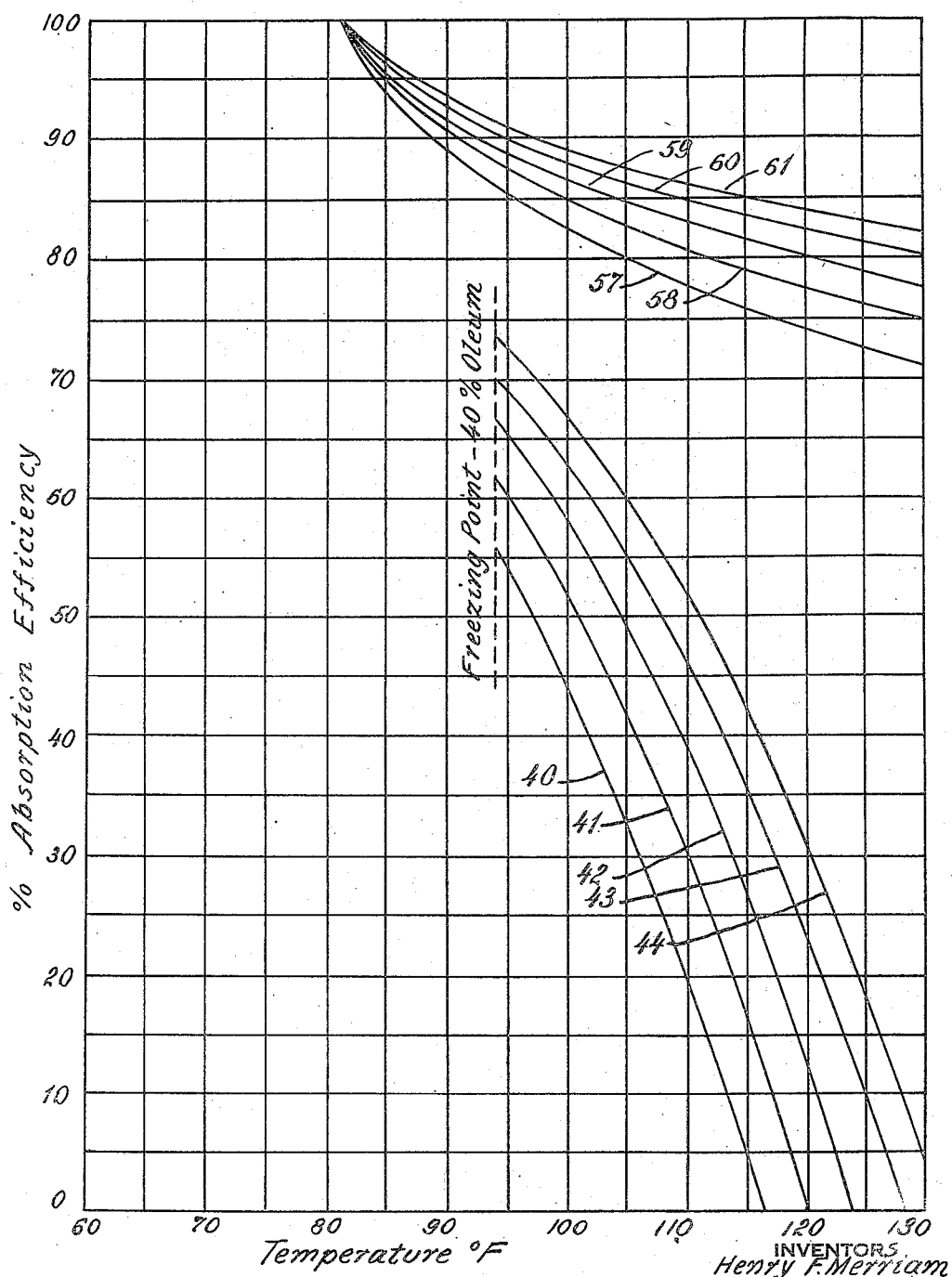
Figure 6:
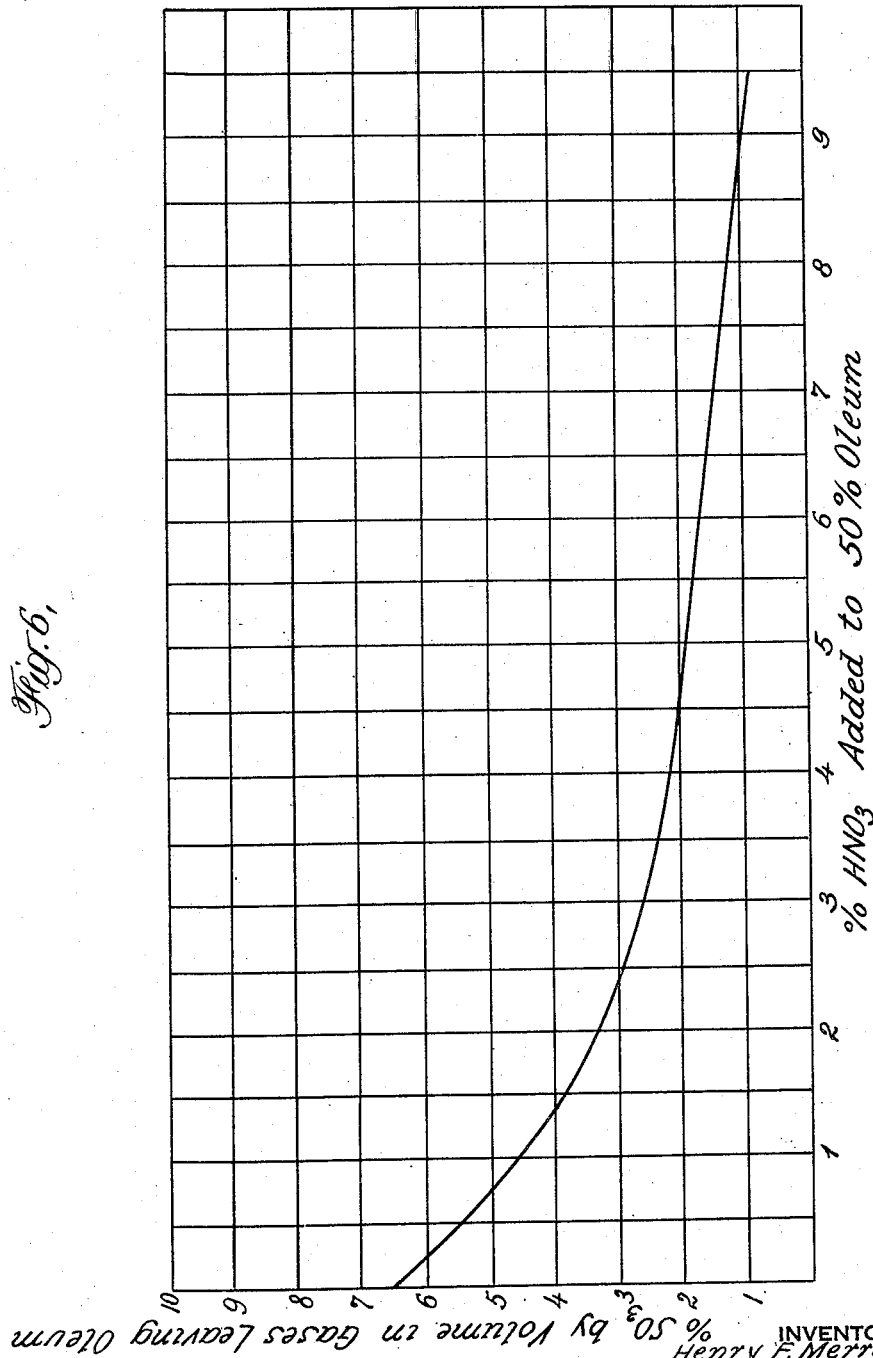

The invention, its objects and the afforded advantages will appear from the following description taken in connection with the accompanying drawings. Fig. 1 shows diagrammatically apparatus suitable for use in production of oleum in accordance with known practice. Figs. 2 and 3 diagrammatically indicate apparatus in which oleum may be made by utilizing principles of the present invention. Figs. 4, 5 and 6 are illustrative and comparative charts, purposes of which will hereinafter appear.

Referring to Figs. 1, 2 and 3, oleum production towers 10, 11 and 12 are of design and construction generally the same as oleum production towers known in the art, and are ordinarily brick-lined steel shells filled with adequate packing. Each tower is provided at the top with a gas outlet, and a liquor inlet and distributing head, and at the bottom with a gas inlet and a liquor outlet. Coolers 14, 15 and 16 are connected to receive oleum running out of the bottom of the respective oleum production towers. Sulfuric acid production towers 18 and 19 (Figs. 1 and 2), built the same as absorption towers customarily used in manufacture of sulfuric acid from $SO_3$, discharge strong e. g. 99% sulfuric acid into coolers 21 and 22. It will be understood that each of the oleum and sulfuric acid towers is provided with its own liquor circulating system including the respective coolers mentioned along with suitable pipe connections indicated diagrammatically on the drawings, together with pumps and control valves, etc., not shown, all arranged to maintain circulation thru the various towers of suitable quantities of oleum or sulfuric acid kept at temperatures required to accomplish the desired $SO_3$ absorption in any particular tower.

Incoming $SO_3$ from a contact plant enters the systems of Figs. 1–3 thru conduits 25, 26 and 27, passes in series thru multi-tower units of Figs. 1 and 2, and tail gases containing substantially no $SO_3$ leave the tops of sulfuric acid production towers 18 and 19 and the top of oleum production tower 12 and are discharged into the plant stacks. Gas movement thru the systems is indicated on the drawings by dotted lines. The diluent used, e. g. water or sulfuric acid of suitable $H_2SO_4$ strength, is fed into the circulating circuits of towers 18, 19 and 12 thru inlets 29, 30 and 31 respectively. Liquor flow thru the systems, indicated on the drawing by solid lines, is generally countercurrent to gas flow. The "make" of oleum production towers 10, 11 and 12, drawn off thru lines 33, 34 and 35, constitutes the products.

The nature of the invention, and the characteristics of the prior art difficulties which the present improvements largely offset, may be best understood by preliminary discussion of manufacture of oleum as currently practiced. In effecting absorption of $SO_3$ gas in oleum liquors, three factors which must be taken into account are: first, the $SO_3$ concentration of the sulfur trioxide gas fed to the oleum system; second, the rapid rise in per cent $SO_3$ by volume present in vapor over oleum as temperature and/or strength of oleum increase; and third, the relatively high freezing points of oleum products of strengths within the more usual commercial ranges. The $SO_3$ gas employed is derived from commercial sources, e. g. the converted gas of an $SO_3$ contact plant, and since such gases of most commercial installations frequently contain about 8.5% or less $SO_3$, it will be seen that the $SO_3$ gases utilized in manufacture of oleum are of relatively low $SO_3$ concentrations. Further, for a given set of operating conditions, freezing point of the oleum product and the per cent $SO_3$ in vapor over such oleum are relatively fixed.

Fig. 1 indicates a representative prior art commercial two-tower system for making oleum of say 40% strength. From the legends on the drawing, over-all operating conditions will be apparent. For illustrative purposes, the incoming gas entering the bottom of tower 10 may have an $SO_3$ concentration of 8.1%. Oleum of 40% strength freezes at about 94° F. Hence, all of the liquor in tower 10, cooler 14, and in the associated liquor circulating system must be kept at temperature above 94° F., and to afford a practical operating safety factor, usual practice is such as to keep temperature at least about 10° F. above 94° F. Per cent $SO_3$ by volume in vapor over 40% oleum (e. g. the per cent $SO_3$ by volume in the vapor leaving the top of tower 10) is about 4.8 at 105° F., that is, if temperature of gas leaving the top of tower 10 is held at about 105° F., such gas contains about 4.8% $SO_3$ by volume. Accordingly, it will be seen that because of the relatively low strength of available incoming $SO_3$, high freezing point of the oleum product, the fairly high percentage of $SO_3$ in vapor over 40% oleum, and the desirability of operating at temperature as low as possible in order to promote $SO_3$ absorption, it is necessary to operate tower 10 within very narrow temperature limits in order to effect reasonably good absorption of $SO_3$ and keep the size of the equipment at a minimum. When making 40% oleum product, using an 8.1% $SO_3$ gas, and tower exit temperatures of about 105° F., only about 42% of the total $SO_3$ entering the bottom of tower 19 is absorbed. In this connection, curves 40, 41, 42, 43, and 44 of the chart of Fig. 5 show the per cent $SO_3$ absorption efficiencies at temperatures of about 94–130° F., when making 40% oleum from $SO_3$ gases produced by catalytic conversion of sulfur dioxide gases containing 7, 8, 9, 10 and 11% $SO_2$ by volume respectively, such gases when oxidized to sulfur trioxide under efficient contacting conditions forming sulfur trioxide gases containing about 7.0, 8.1, 9.1, 10.2, and 11.3% $SO_3$ by volume respectively. It will be noted that at practical operating temperatures of about 105° F., these absorption efficiencies range from about 32% to about 60%.

Further, it will be noted that the system of Fig. 1 produces excess 99% sulfuric acid. The reason is that, because of the high $SO_3$ content of the gas entering tower 18, a large amount of diluent sulfuric acid must be used to clean all of the $SO_3$ out of the gas stream and more 99% $H_2SO_4$ is produced than can be converted to oleum in tower 10. Thus, the system of Fig. 1 is not "balanced," which term designates operation such that all $SO_3$ of incoming gas is converted to oleum of the desired strength, and no $SO_3$ is taken out of the system as intermediate strength oleum or as sulfuric acid. While the "unbalanced" disadvantage of Fig. 1 may be remedied by use of an intermediate strength oleum tower between towers 10 and 18, such procedure involves substantial capital and operating outlay. Hence, in order to maintain "balance," use maximum amounts for fortification acid, and produce maximum amounts of oleum, a three tower system is often employed for making 40% oleum.

We have discovered primarily that if, for a given set of oleum-$SO_3$ gas contacting conditions, the contacting operation is carried out in such a way that the oleum liquor in the contacting zone contains certain amounts of $HNO_3$, the per cent $SO_3$ by volume in vapor over the oleum in such zone is substantially reduced as compared with the per cent $SO_3$ by volume in vapor over the same oleum when the contacting operation is carried out under the same operating conditions in accordance with the prior art, i. e. in the absence of $HNO_3$.

Further, we have observed that under the conditions prevailing in the oleum-$SO_3$ contacting zone, the presence of suitable amounts of $HNO_3$ reduces the freezing points of the oleum liquors. However, in current methods for making oleum, it is not practical especially during the summer months to cool the liquors being processed to less than say 75–80° F., i. e., the temperature of readily available cooling water. Thus, while presence of $HNO_3$ in the oleum liquor in the contacting zone may lower the freezing point of some oleums down to as low as say minus 10° F., in view of the mentioned 75–80° F. practical operating temperature, we note that increased $SO_3$ absorption efficiency, arising out of lowered freezing points and consequent permissibly lower operating temperatures, although appreciable is relatively incidental. Hence from viewpoint of summer operation, the outstanding advantages afforded by the invention are attributable mostly to our discoveries as to the effect of the presence of certain quantities of $HNO_3$ in reducing the per cent $SO_3$ by volume in vapor over the oleum, the substantial extent of which advantages will subsequently appear. However, in plants where refrigerated cooling water is available, and in winter when cooling water may be held at say 40–50° F., substantially increased $SO_3$ absorption efficiency may be had by reason of lowered freezing points.

During development work resulting in the invention difficulties were encountered, even at relatively high operating temperatures, in connection with formation of a solid phase compound, a complex combination of $SO_3$ and $N_2O_5$, which solid plugged up the oleum producing tower and associated oleum liquor circulating system. To prevent formation of solid, we found that the quantity of $HNO_3$ present in the oleum liquor throughout the oleum producing system, i. e. in the oleum production tower and in all liquor flowing thru the cooler and piping associated with the tower, should be such as to provide in the system an oleum liquor containing some but not more $HNO_3$ than is necessary to form an oleum-nitric acid liquor having a total $SO_3$ to $N_2O_5$ mol ratio of not less than 13 $SO_3$ to one $N_2O_5$. As employed herein, "total $SO_3$" is intended to include the total of combined and free $SO_3$. This feature is applicable to all modifications of the invention regardless of the strength of the oleum manufactured and is the controlling factor with respect to prevention of formation of solids either during processing or in the ultimate product. To avoid likelihood of forming solids and to provide operating conditions which need not be watched too closely in practice, it is preferred to regulate the $HNO_3$ content of the oleum liquors so as to provide therein an $SO_3$ to $N_2O_5$ mol ratio of not less than 20:1. It will be understood that in the manufacture of say 20%, 30%, 40%, 50%, or 60% oleum, as the strength of the oleum produced increases, even though the $SO_3$:$N_2O_5$ mol ratio is held at not less than 13:1 or at any other higher given ratio, the permissible amount by weight of 100% basis $HNO_3$ in the liquor increases though not at a relatively rapid rate. For example, in case of a 20% oleum to which has been added sufficient nitric acid in the form of 100% $HNO_3$ to bring the $SO_3$:$N_2O_5$ mol ratio down to 13:1, it is noted that the resulting liquor contains about 9.3% by weight of $HNO_3$. On the other hand, in the circumstance in which sufficient 100% $HNO_3$ has been added to a 65% oleum to bring the $SO_3$:$N_2O_5$ ratio down to 13:1, the resulting liquor would contain about 10.1% by weight of $HNO_3$. Ordinarily, we find no advantage in operating with liquors containing more than about 9–9.3% by weight of $HNO_3$. Further, while liquors containing any appreciable amount of $HNO_3$ may be utilized, it is preferred to maintain in the liquors circulating thru the system at least 1% by weight of $HNO_3$. In the manufacture of the more usual commercial grades of oleum of strengths ranging from say 20 to 60% and upward, preferred procedure is such that the liquors circulating thru the system contain from 4 to about 6% by weight of $HNO_3$. It is noted that in practice of all modifications of the invention in which the oleum constituent of the liquor at any point in the oleum production system contains at least some free $SO_3$ and not more than 6% by weight of $HNO_3$, the $SO_3:N_2O_5$ mol ratio of such liquor is not less than about 20:1, and under these conditions the $SO_3:N_2O_5$ mol ratio is inherently maintained higher than the permissible minimum 13:1 ratio above described. Thus in the manufacture of products of all oleum strengths, when it is desired to operate, as is preferred, so that the $SO_3:N_2O_5$ mol ratio in all liquors in the oleum production system is not less than 20:1, such liquors should contain not more than 6% by weight of $HNO_3$.

We have found that under some circumstances the nitric acid in the oleum production zone developed vapor pressure sufficient so that some $HNO_3$ as such exited the oleum production zone along with unabsorbed $SO_3$ and passed into the final sulfuric acid production tower. In order to prevent exit of nitric acid from the oleum production zone, and to avoid operating difficulties with respect to equipment corrosion and final removal of all $HNO_3$ and $SO_3$ from the gas stream before discharge to the atmosphere, we have discovered that certain further conditions should be maintained in the oleum production zone. We find that in order to prevent the presence of $HNO_3$ in the gas stream leaving the oleum production zone, the contacting operation in the oleum production zone should be such that the oleum liquor, at the point of last contact of $SO_3$ gas with liquor, has a total acidity of not less than 104. For example, in a countercurrent contacting operation, formation of the oleum-nitric acid liquor should be such that the liquor as fed to the top of the oleum production tower has a total acidity of not less than 104. By total acidity of a liquor is meant the numerical sum of (1) the percent by weight of 100% $HNO_3$ plus (2) the per cent by weight of equivalent $H_2SO_4$, contained in the liquor. For example, straight 20% oleum (before addition of any nitric acid) contains 104.5% equivalent $H_2SO_4$ and obviously no $HNO_3$. Hence the total acidity as referred to herein, of straight 20% oleum is 104.5 plus zero equals 104.5. On the other hand, a liquor made—by addition of enough 100% $HNO_3$ to straight 20% oleum to form a liquor containing 1% by weight of $HNO_3$—contains 103.4% equivalent $H_2SO_4$ and 1% by weight of 100% $HNO_3$. Thus the total acidity of such a liquor is 103.4 plus one equals 104.4. As well known in this art, per cent equivalent sulfuric acid is the value obtained if all the $SO_3$ in an oleum liquor were combined with $H_2O$ to form $H_2SO_4$.

In practice of this invention, the $HNO_3$ may be introduced into the oleum liquors in any suitable form, e. g. as 100% $HNO_3$, as a mixed acid containing say 84% $HNO_3$, 12% $H_2SO_4$ and balance water, or as concentrated nitric acid having an $HNO_3$ strength of about 93%, the latter being a readily available and preferred form. Weaker nitric acid may also be used if desired.

With reference to the making up of the oleum-nitric acid liquor to be fed into the oleum production zone, it will be understood that the addition of a given amount of $HNO_3$ to an oleum of given strength will form an oleum-nitric acid liquor having a given total acidity. For example, in the case of a 40% oleum (containing 109% by weight equivalent $H_2SO_4$) to which has been added sufficient nitric acid in the form of 100% $HNO_3$ to incorporate 6% by weight of $HNO_3$ in the resulting oleum-nitric acid liquor, such resulting liquor would have an $SO_3:N_2O_5$ ratio of 21.9:1, and contain (1) 6% by weight of 100% $HNO_3$ and (2) 102.5% by weight of equivalent $H_2SO_4$; and in accordance with the above stated definition the total acidity of the liquor would be 6 plus 102.5 equals 108.5. On the other hand, if in a similar situation there were added to 40% oleum sufficient nitric acid in the form of 93% strength nitric acid to incorporate 6% by weight of $HNO_3$ in the resulting oleum-nitric acid liquor, such resulting liquor would have an $SO_3:N_2O_5$ ratio of 21.8:1; and contain (1) 6% by weight of 100% $HNO_3$ and (2) 101.9% by weight of equivalent $H_2SO_4$. Hence, total acidity would be 6.0 plus 101.9 equals 107.9. Accordingly, it will be understood that in the circumstances in which the nitric acid is introduced into the system in a form containing $H_2O$, such $H_2O$ acts as a diluent of the total mass, lessens the per cent by weight of 100% $HNO_3$ and also the per cent by weight of equivalent $H_2SO_4$, and correspondingly reduces total acidity, the extent of total acidity reduction being dependent upon the amount of $H_2O$ contained in the nitric acid. It is noted that in practice of all modifications of the invention in which the liquor at any point in the oleum production system has a total acidity of not less than 104 and contains not more than 6% by weight of $HNO_3$, the $SO_3N_2O_5$ mol ratio of such liquor is not less than about 21:1, and hence under these conditions the $SO_3:N_2O_5$ mol ratio is automatically maintained higher than the permissible minimum 13:1 ratio above described.

In view of the foregoing disclosures and explanatory comments, the various factors to be taken into consideration in making up and using oleum-nitric acid liquors according to this invention will be apparent to those skilled in the art.

One embodiment of the invention may be described in connection with Fig. 2 of the drawing. To start operation, tower 19 and its liquor circulating system may be filled with strong say 99% sulfuric acid, and oleum tower 11 and its liquor circulating system may be filled with intermediate strength e. g. 20% oleum. Representative $SO_3$ strength and temperature of incoming sulfur trioxide gas, temperature of liquor entering and leaving tower 11, and temperature of the liquor fed into the top of tower 19 may be as indicated by the legends on the drawing. Towers 11 and 19 may be operated as known in the art until the strength of the oleum in tower 11, cooler 15 and associated piping is raised to 40% strength, i. e. 109% equivalent $H_2SO_4$. For illustrative purposes it may be assumed that the extraneous nitric acid employed is of 100% strength. Sufficient 100% nitric acid is introduced by way of cooler 15 to incorporate, in the liquor in the system of tower 11, 5% by weight of 100% $HNO_3$. Thus, there is formed in cooler 15, an oleum-nitric acid liquor having an $SO_3$-$N_2O_5$ ratio of 26.6:1, containing 5% by weight of 100% $NHO_3$, and 103.6% by weight of equivalent $H_2SO_4$, such liquor having a total acidity of 5 plus 103.6 equals 108.6. Circulation of liquor over tower 11 is started, composition and temperature of incoming $SO_3$ gas, temperature of liquor entering and leaving tower 11 being maintained as before. Liquor fed to the top of tower 11 is contacted countercurrent with gas containing $SO_3$, and the per cent free $SO_3$ in the liquor is increased, the amount of such increase being dependent upon particular design of the tower and the rates of liquor and gas contact. In a tower of more or less usual design, increase of free $SO_3$ in the oleum constituent of liquor during one pass thru the tower may be say 2%. In this situation the oleum constituent of liquor discharged from the bottom of tower 11 contains 42% by weight free $SO_3$, and the mixture would contain 4.8% by weight of 100% $HNO_3$ and 104.2% by weight of equivalent $H_2SO_4$, such liquor having a total acidity of 4.8 plus 104.2 equals 109. The "make" is drawn out of the system thru pipe 34, and sufficient strong sulfuric acid from tower 19 and enough 100% nitric acid are run into cooler 15 to maintain the desired composition of the absorbing liquor under the particular conditions of operation.

When operating in this manner, i. e. keeping the liquor-gas equilibrium temperature at the top of tower 11 at about 105° F. and using an 8.1% $SO_3$ gas, the oleum tower exit gas contains about 1.4% $SO_3$ by volume, this 1.4% value comparing with the 4.8% $SO_3$ value shown on Fig. 1 indicating conditions existing when producing 40% oleum and operating in accordance with the prior art. In the operation of Fig. 1, the $SO_3$ absorption efficiency in tower 10 is only 42% whereas in the operation of Fig. 2, $SO_3$ absorption efficiency effected in tower 11 is 83.9%, this marked increase of $SO_3$ absorption efficiency arising from our discoveries as to the effect of the presence of $HNO_3$ in the liquor in reducing the per cent $SO_3$ by volume in vapor over the oleum containing such nitric acid.

The advantages of the invention may be further appreciated from consideration of the curves shown on Figs. 4, 5 and 6. Fig 4 shows per cent free $SO_3$ values (oleum strengths as such) and the per cent $SO_3$ by volume in vapor leaving such oleums. Curves 50, 51 and 52 indicate absorption operations carried out at temperatures of 130° F., 110° F. and 86° F. respectively, the oleums containing no nitric acid. Curves 53, 54 and 55 show absorption operations carried out at temperatures of 130° F., 110° F., and 86° F. respectively, the oleums in these instances containing 4.5–55% by weight of 100% $HNO_3$. The strikingly marked decrease of per cent $SO_3$ by volume in vapors leaving the oleums containing nitric acid is obvious from a comparison of curves 50, 51 and 52 on the one hand and curves 53, 54 and 55 on the other.

Fig. 5 indicates absorption efficiencies at various temperatures. Curves 57, 58, 59, 60 and 61 of Fig. 5 show that by the use of absorbing liquors made up by addition of 40% oleum of 4.5–5.5% $HNO_3$ (introduced as 100% $HNO_3$) and sulfur trioxide gases containing 7%, 8.1%, 9.1%, 10.2%, and 11.3% $SO_3$ by volume respectively, absorption efficiencies at representative operating temperature of 105° F. vary from about 80 to 88%.

Fig. 6 represents the results obtained by the addition of variable amounts of nitric acid to 50% oleum, absorption being carried out at 86° F. It will be noted that as the per cent nitric acid increases the per cent $SO_3$ by volume in the vapor leaving the oleums decreases markedly.

Fig. 3 of the drawing indicates an operation in which the liquor-gas equilibrium temperatures at the top of tower 12 are maintained at 80° F. In all other respects, the operation of tower 12 is the same as the operation of tower 11 of Fig. 2. In the procedure of Fig. 3, it is possible to lower minimum operating temperature to 80° F. because the presence of nitric acid lowers the freezing point of the oleum to less than 70° F. As will be seen from inspection of curves 57—61 of Fig. 5, in the process of Fig. 3, at temperature of about 80° F., $SO_3$ absorption efficiency is about 100%, and the process becomes a one tower system in which a second tower for cleanup of $SO_3$ is unnecessary.

The above principles of the invention apply to the manufacture of all grades of oleum, and by oleum is meant a liquor containing less $H_2O$ than that needed to combine with total $SO_3$ of the liquor to form $H_2SO_4$. It will be understood that in practice of the invention, aside from the above described features relating to the nature of the oleum-nitric acid liquors which are contacted with $SO_3$ gas, other operating factors such as design of the oleum and sulfuric acid production towers and rates of gas and liquor flow thru the towers are the same as known in the art, except that in cases where liquor cooling facilities permit, the oleum production towers may be operated at lower minimum temperatures in accordance with the above indicated decreased freezing points of the oleum liquors.

The herein described reduction of per cent of $SO_3$ by volume in vapor over oleum is of particular value in connection with manufacture of relatively high strength oleums. Accordingly, in the more desirable embodiments of the invention, it is preferred to operate in such a way that the product liquor drawn off from the process contains 4–6% by weight of $HNO_3$ and not less than 30% free $SO_3$.

We claim:

1. In the manufacture of an oleum-nitric acid mixture the improvement comprising passing a gas containing $SO_3$ through an oleum-nitric acid liquor containing at least 1% by weight of $HNO_3$, the amount of said $HNO_3$ being such that the total $SO_3$ to $N_2O_5$ mol ratio is not less than 13:1, and carrying out such contacting operation under conditions to absorb $SO_3$ in said liquor and to maintain in said liquor an $SO_3$ to $N_2O_5$ mol ratio of not less than 13:1, whereby the vapor pressure of $SO_3$ over the oleum-nitric acid liquor in the contact zone is substantially lower than would exist under the same conditions but in the absence of $HNO_3$, and recovering from the contacting operation a liquor of increased total $SO_3$ strength.

2. In the manufacture of an oleum-nitric acid mixture the improvement comprising passing a gas containing $SO_3$ through an oleum-nitric acid liquor containing at least 1% and not more than 6% by weight of $HNO_3$, and carrying out such contacting operation under conditions to absorb $SO_3$ in said liquor and to maintain in said liquor not more than 6% by weight of $HNO_3$, whereby the vapor pressure of $SO_3$ over the oleum-nitric acid liquor in the contact zone is substantially lower than would exist under the same conditions but in the absence of $HNO_3$, and recovering from the contacting operation of liquor of increased total $SO_3$ strength.

3. In the manufacture of an oleum-nitric acid mixture the improvement comprising forming an oleum-nitric acid liquor containing 4–6% by weight of $HNO_3$ passing a gas containing $SO_3$ through said liquor in a gas-liquor contacting zone under conditions to absorb $SO_3$ in said liquor and to maintain in said liquor not more than 6% by weight of $HNO_3$, whereby the vapor pressure of $SO_3$ over the oleum-nitric acid liquor in the contact zone is substantially lower than would exist under the same conditions but in the absence of $HNO_3$, and recovering from said zone a liquor of increased total $SO_3$ strength.

4. In the manufacture of an oleum-nitric acid mixture the improvement comprising passing a gas containing $SO_3$ through an oleum-nitric acid liquor containing at least 1% by weight of $HNO_3$, the amount of said $HNO_3$ being such that the total $SO_3$ to $N_2O_5$ mol ratio is not less than 13:1, the said liquor having at the point of last contact of $SO_3$ gas with such liquor a total acidity of not less than 104, and carrying out such contacting operation under conditions to absorb $SO_3$ in said liquor and to maintain in said liquor an $SO_3$ to $N_2O_5$ mol ratio of not less than 13:1, whereby the vapor pressure of $SO_3$ over the oleum-nitric acid liquor in the contact zone is substantially lower than would exist under the same conditions but in the absence of $HNO_3$, and recovering from the contact operation a liquor of increased total $SO_3$ strength.

5. In the manufacture of an oleum-nitric acid mixture, the improvement comprising continuously forming an oleum-nitric acid liquor (a) containing at least 1% by weight of $HNO_3$, the amount of said $HNO_3$ being such that the total $SO_3$ to $N_2O_5$ mol ratio is not less than 13:1, and (b) having a total acidity of not less than 104, continuously introducing said liquor in a gas-liquor contacting zone, countercurrently contacting said liquor therein with gas containing $SO_3$ under conditions to absorb $SO_3$ in said liquor and to maintain in said liquor an $SO_3$ to $N_2O_5$ mol ratio of not less than 13:1, whereby there is effected during the contacting operation a substantial lowering of the vapor pressure of $SO_3$ over the oleum-nitric acid liquor in the contact zone as compared with the $SO_3$ vapor pressure existing under the same conditions but in the absence of $HNO_3$, and continuously withdrawing liquor of increased total $SO_3$ strength from said zone.

6. In the manufacture of an oleum-nitric acid mixture, the improvement comprising continuously forming an oleum-nitric acid liquor (a) containing at least 1% and not more than 6% by weight of $HNO_3$, and (b) having a total acidity of not less than 104, continuously introducing said liquor into a gas-liquid contacting zone, countercurrently contacting said liquor therein with gas containing $SO_3$ under conditions to absorb $SO_3$ in said liquor and to maintain in said liquor not more than 6% by weight of $HNO_3$, whereby there is effected during the contacting operation a substantial lowering of the vapor pressure of $SO_3$ over the oleum-nitric acid liquor in the contact zone as compared with the $SO_3$ vapor pressure existing under the same conditions but in the absence of $HNO_3$, continuously withdrawing liquor of increased total $SO_3$ strength from said zone and discharging therefrom gas containing residual $SO_3$, and contacting such gas with strong sulfuric acid under conditions to absorb substantially all of said residual $SO_3$.

HENRY F. MERRIAM.
TOM CUMMINGS.

REFERENCES CITED

The following references are of record in the file of this patent:

UNITED STATES PATENTS

| Number | Name | Date |
|---|---|---|
| 884,035 | Nield | Apr. 7, 1908 |
| 1,047,576 | Schultze | Dec. 17, 1912 |
| 1,291,306 | Weber | Jan. 14, 1919 |
| 1,605,004 | Shapleigh | Nov. 2, 1926 |
| 1,896,287 | Clark | Feb. 7, 1933 |
| 2,047,546 | Clark | July 14, 1936 |
| 2,139,721 | Carl | Dec. 13, 1938 |